US012204648B2

(12) United States Patent
Sakib et al.

(10) Patent No.: US 12,204,648 B2
(45) Date of Patent: Jan. 21, 2025

(54) TRANSFER OF OWNERSHIP OF A COMPUTING DEVICE VIA A SECURITY PROCESSOR

(71) Applicant: Microsoft Technology Licensing, LLC, Redmond, WA (US)

(72) Inventors: Md. Nazmus Sakib, Seattle, WA (US); Bryan David Kelly, Carnation, WA (US); Ling Tony Chen, Bellevue, WA (US); Peter David Waxman, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/393,843

(22) Filed: Dec. 22, 2023

(65) Prior Publication Data

US 2024/0256674 A1   Aug. 1, 2024

Related U.S. Application Data

(63) Continuation of application No. 17/330,170, filed on May 25, 2021, now Pat. No. 11,893,118.

(51) Int. Cl.
| | |
|---|---|
| *G06F 21/57* | (2013.01) |
| *G06F 21/62* | (2013.01) |
| *H04L 9/08* | (2006.01) |
| *H04L 9/32* | (2006.01) |

(52) U.S. Cl.
CPC .......... *G06F 21/575* (2013.01); *G06F 21/572* (2013.01); *G06F 21/6209* (2013.01); *H04L 9/0891* (2013.01); *H04L 9/3236* (2013.01); *H04L 9/3247* (2013.01)

(58) Field of Classification Search
CPC .. G06F 21/575; G06F 21/572; G06F 21/6209; G06F 21/64; H04L 9/0891; H04L 9/3236; G06Q 30/018
See application file for complete search history.

(56) References Cited

U.S. PATENT DOCUMENTS

| | | | |
|---|---|---|---|
| 2016/0364787 A1* | 12/2016 | Walker | H04L 9/0891 |
| 2017/0250814 A1* | 8/2017 | Brickell | H04W 12/37 |
| 2021/0026966 A1* | 1/2021 | Ghetie | H04L 9/0894 |
| 2022/0414946 A1* | 12/2022 | Choi | A63F 13/65 |

\* cited by examiner

*Primary Examiner* — Hyun Soo Kim (57) ABSTRACT

Embodiments described herein are directed to transferring the ownership of a computing device from one entity to another entity. For example, a security processor is utilized to boot the computing device. During a boot session, the security processor loads and executes boot code, which determines whether specialized firmware authorized by the current owner indicates whether a transfer of ownership is to occur. In response to determining that the specialized firmware indicates that a transfer of ownership is to occur, the secure processor loads and executes the specialized firmware. The specialized firmware, when executed, causes the security processor to program a set of fuses with the public key of the new owner. Execution of the specialized firmware also causes the security processor to invalidate the public key of the original owner, which is stored in another set of fuses.

20 Claims, 6 Drawing Sheets

TRANSFER OF OWNERSHIP OF A COMPUTING DEVICE VIA A SECURITY PROCESSOR

CROSS-REFERENCE TO RELATED APPLICATIONS

This application is a continuation of U.S. patent application Ser. No. 17/330,170 filed May 25, 2021, entitled "Transfer of Ownership of a Computing Device Via a Security Processor," which is incorporated herein by reference in its entirety.

BACKGROUND

A computing device, such as a system-on-a-chip (SoC), comprises boot code (also referred to herein as read-only memory (ROM) code) that is configured to transfer execution into verified code signed by the owner of the computing device. To achieve this, the boot code needs to know the public key of the owner so that it can perform the verification. This public key should not be changeable by an attacker that has physical access to the computing device, or else the secure boot functionality can be compromised. Conventional techniques maintain the public key in a flash memory device coupled to the main processor (or central processing unit (CPU)) of the device. Not only does this increase the geometry of the CPU, but it also makes the reprogramming process prone to attack, thereby opening a door for a malicious entity to reprogram the computing device with its own public key.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are directed to transferring the ownership of a computing device from one entity to another entity. For example, a security processor is utilized to boot the computing device. During a boot session, the security processor loads and executes boot code, which determines whether specialized firmware authorized by the current owner indicates whether a transfer of ownership is to occur. In response to determining that the specialized firmware indicates that a transfer of ownership is to occur, the secure processor loads and executes the specialized firmware. The specialized firmware, when executed, causes the security processor to program a set of fuses with the public key of the new owner. Execution of the specialized firmware also causes the security processor to invalidate the public key of the original owner, which is stored in another set of fuses.

Further features and advantages of the disclosed embodiments, as well as the structure and operation of various embodiments, are described in detail below with reference to the accompanying drawings. It is noted that the disclosed embodiments are not limited to the specific embodiments described herein. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate embodiments and, together with the description, further serve to explain the principles of the embodiments and to enable a person skilled in the pertinent art to make and use the embodiments.

The features and advantages of the disclosed embodiments will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Numerous exemplary embodiments are described as follows. It is noted that any section/subsection headings provided herein are not intended to be limiting. Embodiments are described throughout this document, and any type of embodiment may be included under any section/subsection. Furthermore, embodiments disclosed in any section/subsection may be combined with any other embodiments described in the same section/subsection and/or a different section/subsection in any manner.

II. Example Implementations

There are instances in which ownership of a computing device (e.g., a system-on-a-chip) is to be transferred from one owner to another owner. One example of this is where a cloud provider that originally owns a computing device later decides to lease or even sell the computing device to another company. In such a case, the current owner may desire to be able to reprogram the device to support using the public key of the new owner, which is used to verify code signed by the new owner. This ownership transfer mechanism can also be useful if the current owner's signing private key is compromised, and the owner wishes to change the verification public key to a new public key where the private key is not compromised.

Embodiments described herein are directed to transferring the ownership of a computing device from one entity to another entity. For example, a security processor is utilized to boot the computing device. During a boot session, the security processor loads and executes boot code, which determines whether specialized firmware authorized by the current owner indicates whether a transfer of ownership is to occur. In response to determining that the specialized firmware indicates that a transfer of ownership is to occur, the secure processor loads and executes the specialized firmware. The specialized firmware, when executed, causes the security processor to program a set of fuses with the public key of the new owner. Execution of the specialized firmware also causes the security processor to invalidate the public key of the original owner, which is stored in another set of fuses.

The foregoing techniques advantageously protect the transfer process from being compromised by a malicious entity, as the transfer process is achieved via fuses that are only programmable with public keys during a boot session by the security processor. In other words, they are not accessible by any entity other than the security processor. Moreover, the foregoing techniques remove the need to maintain a large flash memory device to store the public keys, which advantageously reduces the geometry of the CPU (central processing unit).

Figure 1:
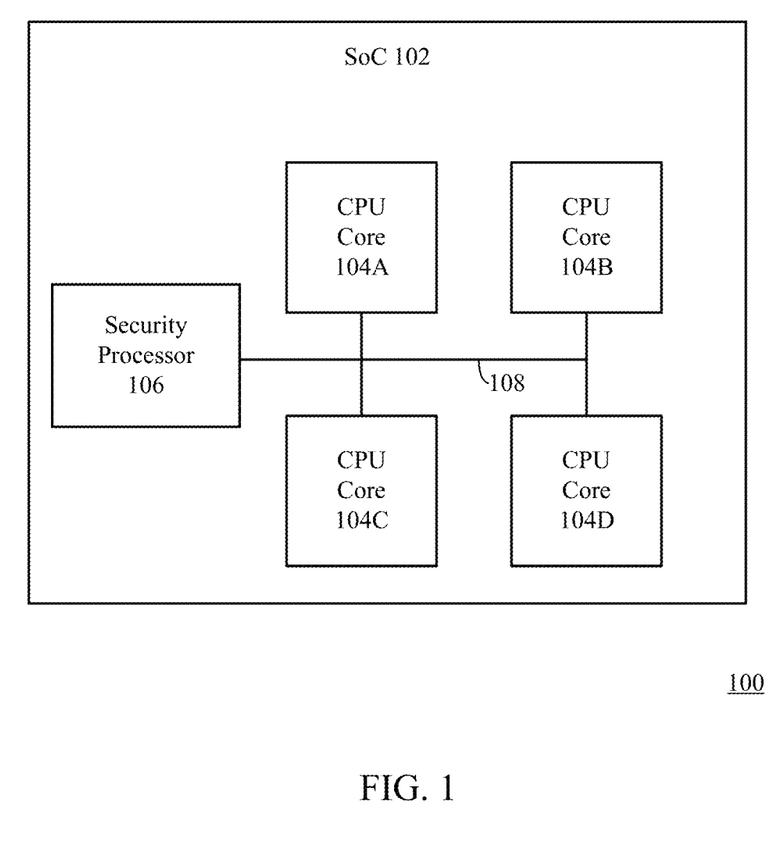
FIG. 1 depicts a block diagram of a system configured to transfer ownership of a computing device from a first entity to a second entity in accordance with an example embodiment.

For instance, FIG. 1 depicts a block diagram of a system 100 configured to transfer ownership of a computing device from a first entity to a second entity in accordance with an example embodiment. As defined herein, an entity may include, but is not limited to, a person, a company, an organization, an enterprise, etc. As shown in FIG. 1, system 100 comprises a system-on-a-chip (SoC) 102. SoC 102 comprises a plurality of CPU cores 104A-104D and a security processor 106. It is noted that while SoC 102 includes four CPU cores, SoC 102 may include any number of CPU cores. CPU cores 104A-104D and security processor 106 are communicatively coupled via a bus interconnect 108 by which CPU cores 104A-104D and/or security processor 106 may transmit and/or receive data, control signals, and/or other information signals therebetween. Bus interconnect 108 may be implemented via one or more wires, traces, or other forms of routing/interconnect; however, the embodiments described herein are not so limited. Each of CPU cores 104A-104D may be configured to fetch, decode, execute, and commit instructions and to process data according to a particular instruction set architecture (ISA), such as, but not limited to an x86 instruction set. In accordance with an embodiment, CPU cores 104A-104D may be 32-bit or 64-bit complex instruction set computer (CISC)-based processor cores; although the embodiments described herein are not so limited. Security processor 106 and CPU cores 104A-104D may be implemented on the same die. One or more of CPU cores 104A-104D is configured to execute an operating system of the device in which SoC 102 is included, whereas security processor 106 may not be configured to execute an operating system. Thus, security processor 106 is securely isolated from any malware configured to be executed via the operating system, as such malware is unable to be executed on security processor 106. Examples of operating systems, include, but are not limited to, the MICROSOFT® WINDOWS® Operating System (OS), published by Microsoft Corporation of Redmond, Washington, the LINUX® operating system and other UNIX® variants, etc.

Security processor 106 may comprise a hardware security module (or platform) that is configured to manage public keys, perform encryption and decryption functions for digital signatures, and/or perform other cryptographic functions. In accordance with an embodiment, security processor 106 facilitates the transfer of ownership of SoC 102 and/or a device in which SoC 102 is included. Examples of such devices include, but are not limited to, a desktop computer, a laptop computer, a server, a tablet computer, a smart phone, etc., and/or various components included therein, including, but not limited to, a hard drive, a solid state drive, a processor (e.g., a CPU), a microcontroller, a graphics card, etc.

Security processor 106 may comprise a plurality of fuse banks, each comprising a plurality of fuses. Each bank of fuses may be configured to store a public key of a different entity. Each bank may be associated with a fuse that invalidates the public key stored in the corresponding bank of fuses (referred herein as an owner revoke fuse). Only a single bank of fuses is valid at any given time. Thus, the device can only be owned by a single entity at any given time. The fuses are programmable (or blowable) during a boot session of the device and during a valid transfer of ownership process. The current owner (i.e., the first entity) consents to and initiates the ownership transfer by authoring firmware configured to program a bank of fuses with the public key of the second entity and also configured to blow the fuse associated with the bank of fuses that stores the public key of the first entity. Additional details regarding the transfer of ownership process are described below with reference to FIG. 2.

Figure 2:
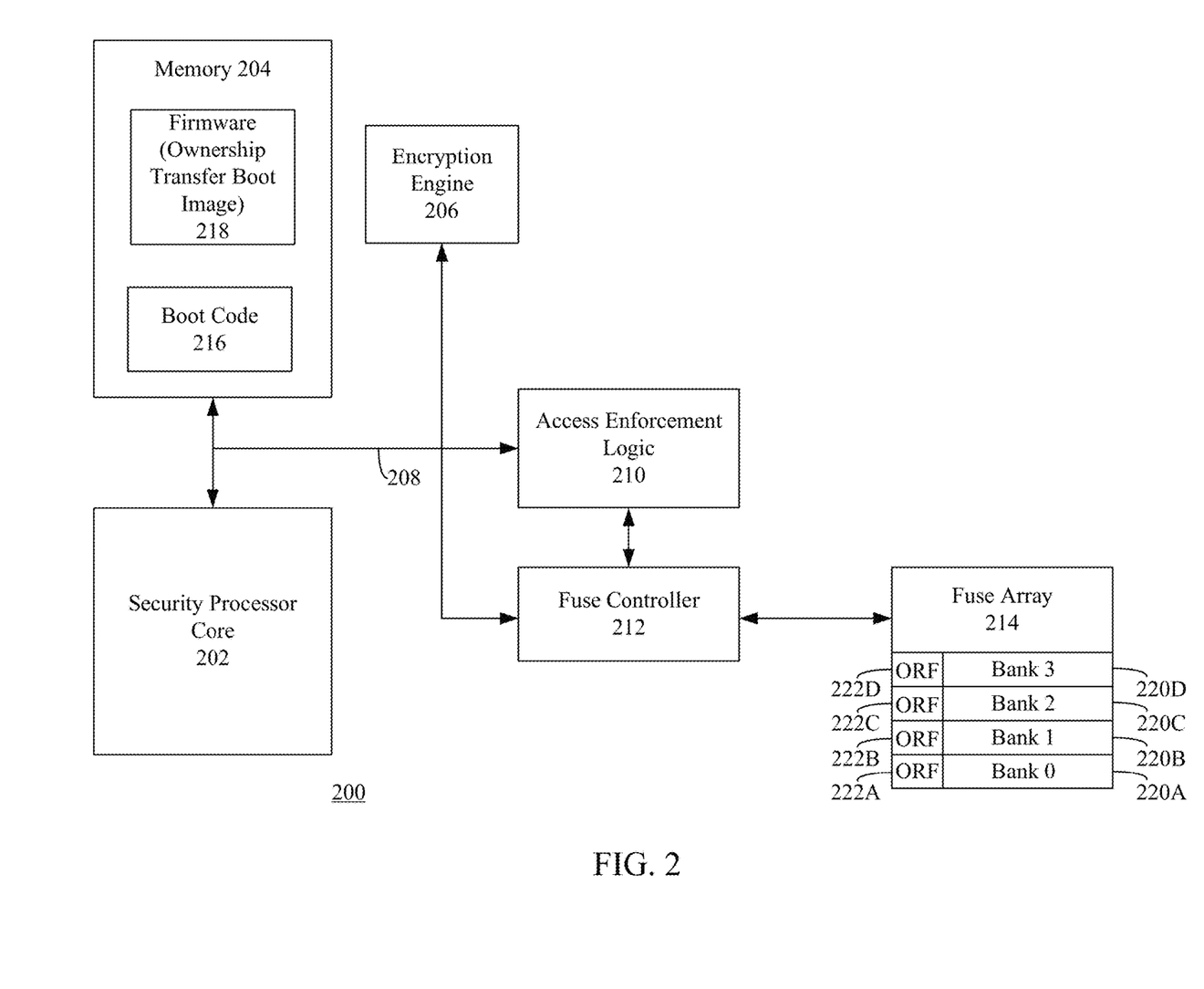
FIG. 2 is a block diagram of a security processor in accordance with an example embodiment.

For example, FIG. 2 is a block diagram of a security processor 200 in accordance with an example embodiment. Security processor 200 is an example of security processor 106, as described above with reference to FIG. 1. As shown in FIG. 2, security processor 200 comprises a security processor core 202, a memory 204, an encryption engine 206, access enforcement logic 210, a fuse controller 212, and a fuse array 214. Security processor core 202, memory 204, encryption engine 206, access enforcement logic 210, fuse controller 212, and fuse array 214 are communicatively coupled via a bus interconnect 208, which is an example of bus interconnect 108, as described above with reference to FIG. 1. Bus interconnect 208 may be communicatively coupled to other components not described with reference to FIG. 2, including, but not limited to, CPU cores 104A-104D, as described above with reference to FIG. 1.

Security processor core 202 may be a real-time processor core that is optimized for high performance, hard real-time and safety-critical applications. An example of such a processor core includes, but is not limited to, the ARM Cortex-R processor developed by ARM Holdings of Cambridge, United Kingdom. In accordance with an embodiment, security processor core 202 may be a 32-bit or 64-bit reduction instruction set computer (RISC)-based processor core; although the embodiments described herein are not so limited.

Memory 204 stores boot code 216 and various types of firmware. Boot code 216 comprises code (or instructions) that are executable by security processor core 202 during a boot session (i.e., when a device in which security processor 200 is included is starting up after being powered on or reset). Examples of firmware include, but are not limited to, basic input/output system (BIOS) firmware, UEFI (unified extensible firmware interface) (UEFI) BIOS firmware, and various device-specific firmware, such as hard disk drive firmware, solid state drive firmware, video BIOS firmware, etc. As described below, memory 204 may also comprise a type of firmware (shown as firmware 218) that facilitates the transfer of ownership between two entities. Such a firmware is referred herein as an ownership transfer boot image. Examples of memory 204 include, but are not limited to, a non-volatile read-only memory device (e.g., flash memory, erasable programmable read-only memory (EPROM), an electrically erasable programmable read-only memory (EEPROM), and/or the like.

Fuse array 214 comprises a plurality of fuse banks 220A, 220B, 220C, and 220D. Each of fuse banks 220A, 220B, 220C, and 220D comprises a plurality of one-time programmable fuses. The fuses may be electronic fuses (i.e., eFuses) or anti-fuses that have one of two different states. An e-fuse is a microscopic fuse in a computer chip, which may be fabricated of a semiconductor material (e.g., silicon) and/or metal traces. An e-fuse may be blown by electromigration or in another suitable manner. However, the embodiments described herein are not so limited. Data may be written (or programmed) to a fuse bank by selectively blowing fuses in the fuse bank, where a blown fuse may correspond to a value of "1", and an unblown fuse may correspond to a value of "0", or vice versa. Each of fuse banks 220A, 220B, 220C, and 220D is configured to store a public key of a particular entity. In accordance with an embodiment, each of fuse banks 220A, 220B, 220C and 220D stores a hash representative of the public key. The hash may comprise may be a 384-bit hash value. In accordance with such an embodiment, each of fuse banks 220A, 220B, 220C, and 220D comprise 384 fuses. However, it is noted that the hash may comprise any number of bits, including, but not limited to 128 bits, 256 bits, etc., and each of fuse banks 220A, 220B, 220C, and 220D may comprise a corresponding number of fuses. After manufacturing, the fuses of a particular fuse bank (e.g., fuse bank 220A) may be programmed to store the public key of the first owner. The public key may also be hard coded in memory 204 if it is known at the time of tape-out of security processor 200. This guarantees that when security processor 200 is manufactured, it has a default owner to start with before blowing any fuses.

Each of fuse banks 220A, 220B, 220C, and 220D is also associated with an owner revoke fuse. For example, fuse bank 220A is associated with an owner revoke fuse 222A, fuse bank 220B is associated with an owner revoke fuse 222B, fuse bank 220C is associated with an owner revoke fuse 222C, and fuse bank 220D is associated with an owner revoke fuse 222D. Each of owner revoke fuses 222A, 222B, 222B, and 222D may be utilized to invalidate (or revoke) the public key stored in its corresponding fuse bank. Each of owner revoke fuses 222A, 222B, 222B, and 222D may initially be in an unblown state. To revoke a public key, the corresponding revoke fuse may be blown. For example, to revoke a public key stored in bank 220A, owner revoke fuse 222A may be blown. To revoke a public key stored in bank 220B, owner revoke fuse 222B may be blown. To revoke a public key stored in bank 220C, owner revoke fuse 222C may be blown. To revoke a public key stored in bank 220D, owner revoke fuse 222D may be blown.

Access enforcement logic 210 is configured to allow or deny the ability to program the fuses in fuse array 214. For example, when a transfer of ownership is to be performed, access enforcement logic 210 enables the fuses in fuse array 214 to be programmed. For instance, access enforcement logic 210 may send a first command to fuse controller 212, which causes fuse controller 212 to grant requests to program fuses in fuse array 214. When a determination is made that no transfer of ownership is to be performed, access enforcement logic 210 prevents the fuses in fuse array 214 from being programmed. For instance, access enforcement logic 210 may send a second command to fuse controller 212, which causes fuse controller 212 to deny requests to program fuses in fuse array 214. In accordance with an embodiment, fuse controller 212 and access enforcement logic 210 default to preventing fuses in fuse array 214 from being programmed. In accordance with such an embodiment, the second command is not provided to fuse controller 212.

To facilitate the transfer of ownership, the first entity (i.e., the current owner) of the device may author ownership transfer boot image 218. Ownership transfer boot image 218 comprises a flag (i.e., an ownership transfer flag) that denotes whether ownership transfer boot image 218 is configured to perform a transfer of ownership. In accordance with an embodiment, the flag is in the header of ownership transfer boot image 218. The header may also comprise additional information, such as, but not limited to, an allow list of one or more identifiers of the devices for which ownership is to be transferred (e.g., SoC 102), a public key associated with the first entity and/or a public key associated with the second entity. The public key of the first entity may be stored in memory 204, in addition to and/or in lieu of being stored in the header of ownership transfer boot image 218. Ownership transfer boot image 218 further comprises code, when executed by security processor core 202, causes security processor core 202 to program one of fuse banks 220A-220D with a public key of the second entity (the future owner). The instructions may also cause security processor core 202 to blow the owner revoke fuse associated with the fuse bank that stores the public key of the first entity, thereby revoking the public key of the first entity. Ownership transfer boot image 218 may also encrypted with and signed by the private key of the first entity. It is noted that certain portions of ownership transfer boot image 218 may not be encrypted, such as, but not limited to, the public key of the first entity, and the public key of the second entity. The first entity loads ownership transfer boot image 218 into each device that the first entity desires to transfer to a second entity.

During a boot session of a device to be transferred, security processor core 202 loads and executes boot code 216. Boot code 216, when executed, causes security processor core 202 to copy ownership transfer boot image 218 from memory 204 to memory incorporated within security processor core 202, such as, but not limited to static random access memory (SRAM). Boot code 216 then causes security processor core 202 verify the public key of the first entity (included in the header of ownership transfer boot image 218 and/or memory 204) to ensure that ownership transfer boot image 218 was provided by an authorized entity. To verify the public key, security processor core 202 may send a read request to fuse controller 212. Fuse controller 212 reads each of fuse banks 220A, 220B, 220C, and 220D and returns the values stored therein to security processor core 202, along with the values represented by associated owner refuse fuses 222A, 222B, 222C, and 222D. Security processor core 202 reads the values returned from fuse controller 212 and determines whether one of the values are equal to the public key associated with the first entity. In the event that the public key is not found in any of fuse banks 220A, 220B, 220C, and 220D, security processor core 202 may program the public key that was included in the header of ownership transfer boot image 218 into an empty bank of fuse banks 220A, 220B, 220C, and 220D. The empty bank should also have an associated owner revoke fuse that is unblown. If no empty slot is found, the boot session and the ownership transfer fails.

In an embodiment in which fuse banks 220A, 220B, 220C, and 220D are configured to store a hash of the public key, security processor core 202 may provide the public key of the first entity to encryption engine 206. Encryption engine 206 is configured to generate a hash of the public key. Encryption engine 206 may generate the hash in accordance with an encryption algorithm. Examples of encryption algorithms include, but are not limited to, an advanced encryption standard (AES)-based algorithm, an algorithm based on the secure hash algorithm (SHA), an algorithm based on the public key algorithm (PKA), and/or the like. Encryption engine 206 returns the hash to security processor core 202.

If a match between the public keys (or their hashes) is found, security processor core 202 uses the public key to verify the signature and decrypt the firmware. Security processor core 202 then analyzes the header of the decrypted firmware to determine whether it includes an ownership transfer flag, and if so, determines whether the ownership transfer flag indicates whether a transfer of ownership to be performed. For example, the ownership transfer flag may indicate that a transfer of ownership is to be performed if it is set to a value of '1', whereas a value of '0' indicates that a transfer of ownership is not to be performed, or vice versa.

In response to determining that a transfer of ownership is to be performed, security processor core 202 obtains an identifier of the device on which firmware transfer boot image 218 is loaded (e.g., SoC 102) and compares the identifier to the allow list of identifiers included in the header of firmware transfer boot image 218. In an embodiment in which the device is SoC 102, the identifier may be written into a non-volatile memory of SoC 102 during manufacturing and may be retrieved by security processor core 202 by querying the non-volatile memory. If the obtained identifier does not match one of the identifiers on the list, security processor core 202 aborts the boot process and the transfer of ownership fails. If the obtained identifier matches one of the identifiers on the list, security processor core 202 executes code of boot code 216 that causes security processor core 202 to send a command to access enforcement logic 210. The command indicates that access enforcement logic 210 is to enable the programming of fuses in fuse array 214. In response to receiving the command, access enforcement logic 210 may send a first command to fuse controller 212, which causes fuse controller 212 to grant requests to program fuses in fuse array 214. The list of identifiers advantageously enables the first entity to designate which of its devices are to be transferred to the second entity. If the list of identifiers were not utilized, and only the public key of the first entity was utilized for verification, then then any device associated with that public key would be transferable to the second entity.

After access enforcement logic 210 enables the programming of fuses in fuse array 214, security processor core 202 executes ownership transfer boot image 218. Security processor core 202 executes the code of ownership transfer boot image 218 that causes security processor core 202 to program one of fuse banks 220A-220D with a public key of the second entity. For example, the execution of the code may cause security processor core 202 to send a program request to fuse controller 212. The command includes the public key to be programmed in an empty fuse bank of fuse array 214 (e.g., a fuse bank comprising all zeroes and that does not have it associated owner revoke fuse blown). Responsive to receiving the program request, fuse controller 212 determines an empty fuse bank of fuse array 214 and programs the fuses therein to store the public key of the second entity. For example, suppose the original owner's public key is stored in fuse bank 220A, and all other fuse banks are empty, fuse controller 212 may program the public key of the second entity in the next empty fuse bank (e.g., fuse bank 220B). Fuse controller 212 may program fuse bank 220B by blowing certain fuses of fuse bank 220B so that the state of fuses represents the value of the public key of the second entity. For example, suppose the public key is "0101" and there are four fuses in fuse bank 220B. In this example, fuse controller 212 would blow the first and third fuses so that these fuses represent the value of '1'. Fuse controller 212 would not blow the second and fourth fuses so that these fuses represent the value of '0'.

Responsive to receiving the program request and/or programming fuse bank 220B, fuse controller 212 may also blow owner revoke fuse 222A, as it is associated with fuse bank 220A, thereby revoking the public key of the first entity.

As described above, fuse banks 220A, 220B, 220C, and 220D may store a hash of an owner's public key. In accordance with such an embodiment, security processor core 202 may provide the public key of the second entity to encryption engine 206, which generates a hash of the public key. Encryption engine 206 returns the hash of the public key to security processor core 202, and security processor core 202 includes the hash of the public key in the program request sent to fuse controller 212.

In response to determining that a transfer of ownership is not being performed (e.g., the ownership transfer flag is not set), security processor core 202 executes code of boot code 216 that causes security processor core 202 to send a command to access enforcement logic 210, which indicates that access enforcement logic 210 is to prevent the programming of fuses in fuse array. In response to receiving such a command, access enforcement logic 210 may send a command to fuse controller 212, which causes fuse controller 212 to deny requests to program fuses in fuse array 214.

After security processor core 202 finishes executing ownership transfer boot image 218 (and the appropriate fuses to facilitate the transfer of ownership are programmed), security processor core 202 may load and execute other types of firmware stored in memory 204 and finishes the boot session. The first entity may then power down the device and provide the device to the second entity (i.e., the new owner). It is noted that the foregoing process is performed for each device for which the first entity intends to transfer ownership to the second entity.

The new owner authors a type of firmware that is configured to confirm that the new owner is the only owner of device being transferred thereto. Such a firmware is referred herein as an ownership transfer check revocation image. The new owner loads this firmware onto into memory 204 of each device to be transferred thereto. During a boot session, boot code 216 loads the ownership transfer check revocation image into memory incorporated within security processor core 202 (e.g., SRAM)

Boot code 216, when executed, causes security processor core 202 to copy the ownership transfer check revocation image from memory 204 to memory incorporated within security processor core 202, such as, but not limited to static random access memory (SRAM). Boot code 216 then causes security processor core 202 verify the public key of the new owner (e.g., included in the header of the ownership transfer check revocation image and/or stored in memory 204). To verify the public key, security processor core 202 may send a read request to fuse controller 212. Fuse controller 212 reads each of fuse banks 220A, 220B, 220C, and 220D and returns the values stored therein to security processor core 202, along with the values represented by associated owner refuse fuses 222A, 222B, 222C, and 222D. Security processor core 202 reads the values returned from fuse controller 212 and determines whether one of the values are equal to the public key associated with the first entity. In the event that the public key is not found in any of fuse banks 220A, 220B, 220C, and 220D, the boot session and the ownership transfer fails.

If a match between the public keys (or their hashes) is found, the ownership transfer check revocation image causes security processor core 202 to determine whether any of the other fuse banks of fuse banks 220A, 220B, 220C, and 220D store non-zero values (indicating that they are not empty and possibly store a public key of another owner). For such fuse banks, security processor core 202 determines whether their corresponding owner revoke fuses are blown. If any of the owner revoke fuses are not blown, security processor core 202 provide a program request to fuse controller 212 that specifies which of owner revoke fuses 222A, 222B, 222C, and 222D should be blown. For instance, if the new owner's public key is programmed into fuse bank 220B and fuse banks 220A and 220C comprise non-zero values, the program request may specify that owner request fuses 222A and 222C are to be blown. Responsive to receiving the program request, fuse controller 212 blows owner request fuses 222A and 222C, thereby revoking the public keys stored in fuse banks 220A and 220C.

Figure 3:
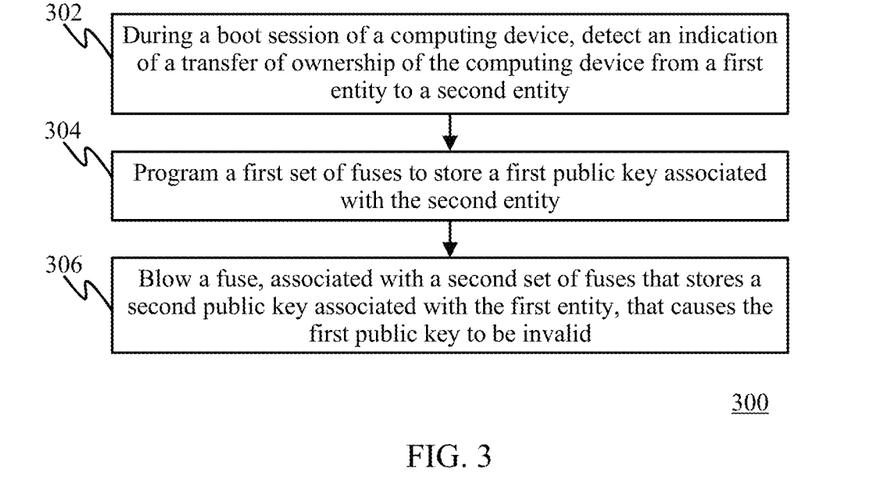
FIG. 3 depicts a flowchart of an example method performed by a computing device for transferring the ownership of the computing device from a first entity to a second entity in accordance with an embodiment.

Accordingly, the ownership of a device may be transferred from a first entity to a second entity in many ways. For example, FIG. 3 depicts a flowchart 300 of an example method performed by a computing device for transferring the ownership of the computing device from a first entity to a second entity in accordance with an example embodiment. In an embodiment, flowchart 300 may be implemented by security processor 200. The method of flowchart 300 will be described with continued reference to security processor 200 of FIG. 2, although the method is not limited to that implementation. Other structural and operational embodiments will be apparent to persons skilled in the relevant art(s) based on the discussion regarding flowchart 300 and security processor 200 of FIG. 2.

As shown in FIG. 3, the method of flowchart 300 begins at step 302, in which, during a boot session of the computing device, an indication of a transfer of ownership of the computing device from a first entity to a second entity is detected. For example, with reference to FIG. 2, boot code 216 may comprise code that, when executed, causes security processor core 202 to detect an indication of a transfer of ownership of the computing device from a first entity to a second entity.

In accordance with one or more embodiments, the indication comprises a flag in a header of firmware that, when set, indicates the transfer of ownership of the computing device from the first entity to the second entity. For example, with reference to FIG. 2, ownership transfer boot image 218 comprises a flag in its header, that, when set, indicates the transfer of ownership of the computing device from the first entity to the second entity.

In accordance with one or more embodiments, the flag is utilized to determine whether requests for programming fuses of fuse array 214 are granted or denied. Additional details regarding such techniques are described below with reference to FIG. 4.

In accordance with one or more embodiments, the firmware is signed with a private key of the first entity. For example, with reference to FIG. 2, ownership transfer boot image 218 is signed with a private key of the first entity.

At step 304, in response to detecting the indication of the transfer of ownership of the computing device from the first entity to the second entity, a first set of fuses is programmed to store a first public key associated with the second entity. For example, with reference to FIG. 2, security processor code 202 executes ownership transfer boot image 218, which causes security processor code 202 to provide a program request to fuse controller 212. The program request may comprise the first public key associated with the second entity (i.e., the new owner). Responsive to receiving the program request, fuse controller 212 programs the first set of fuses (e.g., fuses of fuse bank 220B) to store the public key of the second entity.

At step 306, a fuse, associated with a second set of fuses that stores a second public key associated with the first entity, is blown. The blowing of the fuse causes the first public key to be invalid. For example, with reference to FIG. 2, the program request provided by security processor core 202 may also cause fuse controller 212 to blow a fuse associated with a second set of fuses that stores a second public key associated with the first entity. For example, if the public key of the first entity (i.e., the original owner) is stored in fuses of fuse bank 220A, fuse controller 212 blows owner request fuse 222A, thereby invalidating the public key stored in fuse bank 220A.

Figure 4:
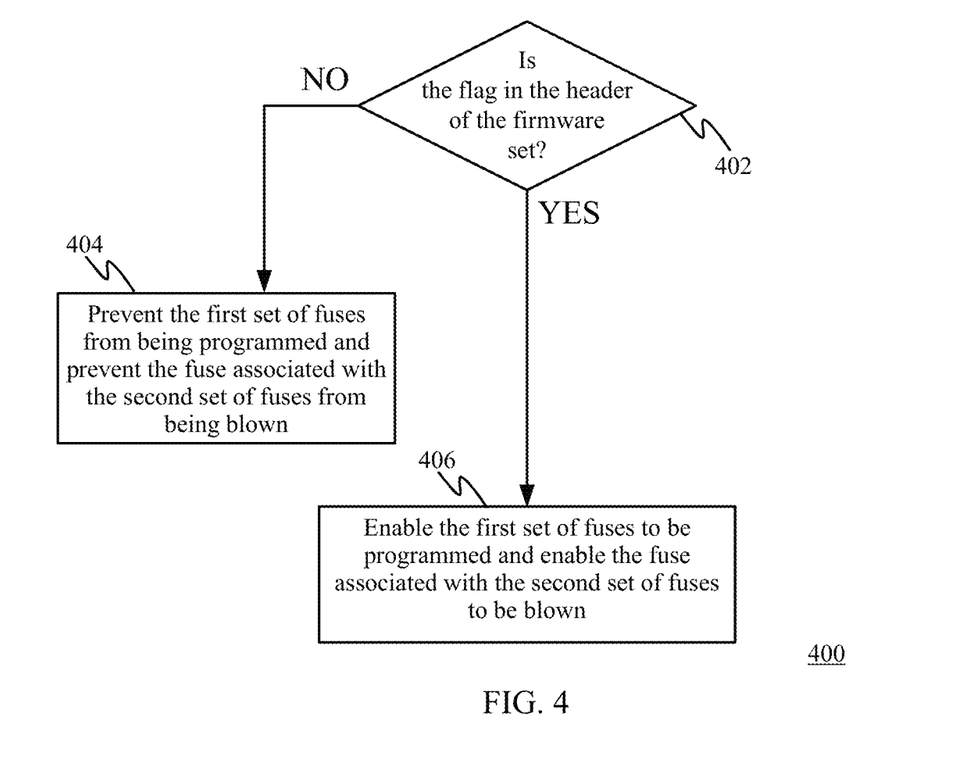
FIG. 4 depicts a flowchart of an example method performed by a computing device for determining whether fuses of a fuse array are enabled to be programmed in accordance with an embodiment.

FIG. 4 depicts a flowchart 400 of an example method performed by a computing device for determining whether the fuses of a fuse array are enabled to be programmed in accordance with an example embodiment. In an embodiment, flowchart 400 may be implemented by security processor 200. Accordingly, the method of flowchart 400 will be described with continued reference to security processor 200 of FIG. 2, although the method is not limited to that implementation. Other structural and operational embodiments will be apparent to persons skilled in the relevant art(s) based on the discussion regarding flowchart 400 and security processor 200 of FIG. 2.

As shown in FIG. 4, the method of flowchart 400 begins at step 402, in which, a determination is made as to whether the flag in the header of the firmware is set. The flag, when set, indicates that ownership of the computing device is being transferred from the first entity and the second entity. If a determination is made that the flag is not set, flow continues to step 404. Otherwise, flow continues to flow 406. For example, with reference to FIG. 2, boot code 216 may comprise code that, when executed, causes security processor core 202 to determine whether the flag in ownership transfer boot image 218 is set.

At step 404, in response to a determination that the first flag is not set, the first set of fuses are prevented from being programmed and the fuse associated with the second set of fuses are prevented from being programmed. For example, with reference to FIG. 2, in response to determining that a transfer of ownership is not being performed (e.g., the ownership transfer flag is not set), security processor core 202 may send a command to access enforcement logic 210, which indicates that access enforcement logic 210 is to prevent the programming of the fuses in fuse array 214 (e.g., the first set of fuses (e.g., fuse bank 220B)) and prevent the programming of owner revoke fuse 222A associated with fuse bank 220A. In response to receiving such a command, access enforcement logic 210 may send a command to fuse controller 212, which causes fuse controller 212 to deny requests to program fuses in fuse array 214 (e.g., e.g., fuse bank 220B and owner revoke fuse 222A).

At step 406, in response to a determination that the flag is set, the first set of fuses are enabled to be programmed and the fuse associated with the second set of fuses is enabled to being programmed. For example, with reference to FIG. 2, in response to determining that a transfer of ownership is being performed (e.g., the ownership transfer flag is set), security processor core 202 may send a command to access enforcement logic 210, which indicates that access enforcement logic 210 is to enable the programming of the fuses in fuse array 214 (e.g., the first set of fuses (e.g., fuse bank 220B) and owner revoke fuse 222A associated with the fuse bank 220A). In response to receiving such a command, access enforcement logic 210 may send a command to fuse controller 212, which causes fuse controller 212 to allow requests to program fuses in fuse array 214 (e.g., fuse banks 220B and owner revoke fuse 222A).

Figure 5:
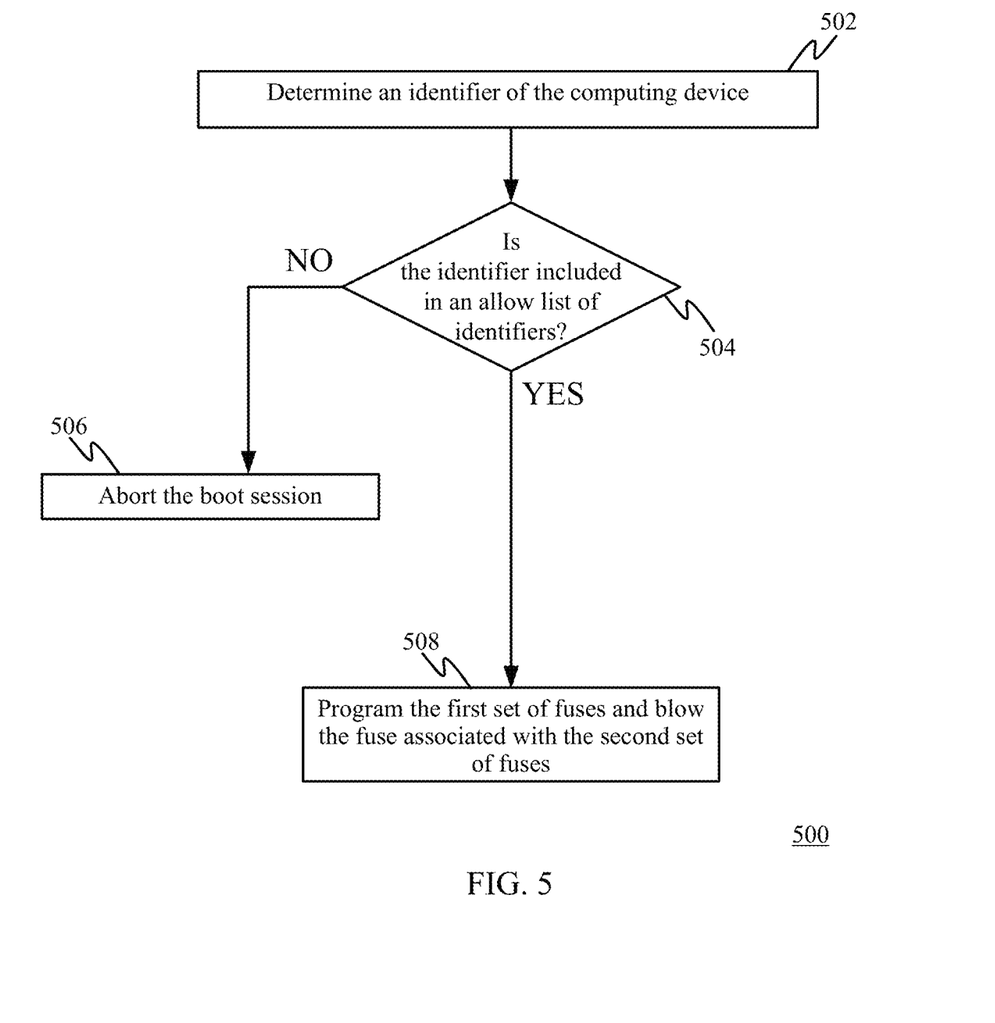
FIG. 5 depicts a flowchart of an example method performed by a computing device for transferring ownership of a computing device based on verification of an identifier of the computing device in accordance with an embodiment.

In accordance with one or more embodiments, an identifier of the device to be transferred is also verified before initiating a transfer of ownership. This ensures that the transfer process is only performed on the devices that the first entity intends to transfer to the second entity. For example, FIG. 5 depicts a flowchart 500 of an example method performed by a computing device for transferring ownership of a computing device based on verification of an identifier of the computing device in accordance with an example embodiment. In an embodiment, flowchart 500 may be implemented by security processor 200. Accordingly, the method of flowchart 500 will be described with continued reference to security processor 200 of FIG. 2, although the method is not limited to that implementation. Other structural and operational embodiments will be apparent to persons skilled in the relevant art(s) based on the discussion regarding flowchart 500 and security processor 200 of FIG. 2.

As shown in FIG. 5, the method of flowchart 500 begins at step 502, in which, an identifier of the computing device is determined. For example, with reference to FIG. 2, security processor core 202 obtains an identifier of the device on which firmware transfer boot image 218 is loaded (e.g., SoC 102). In an embodiment in which the device is SoC 102, the identifier may be written into a non-volatile memory of SoC 102 during manufacturing and may be retrieved by security processor core 202 by querying the non-volatile memory.

At step 504, a determination is made as to whether the identifier is included in an allow list of identifiers. In response to determining that the identifier is not included in the allow list of identifiers, flow continues to step 506. Otherwise, in response to at least detecting the indication of the transfer of ownership of the computing device (as described in step 302 of FIG. 3) and determining that the first identifier is included in the allow list, flow continues to step 508. For example, with reference to FIG. 2, security processor core 202 compares the identifier to the allow list of identifiers included in the header of firmware transfer boot image 218.

At step 506, the boot session is aborted. For example, with reference to FIG. 2, security processor core 202 aborts the boot session, and the transfer of ownership fails.

At step 508, the first set of fuses are programmed, and the fuse associated with the second set of fuses is blown. For example, with reference to FIG. 2, security processor core 202 executes code of boot code 216 that causes security processor core 202 to send a program request to fuse controller 212. The program request indicates that the first set of fuses (e.g., fuse bank 220B) are to be programmed and/or that the fuse (owner revoke fuse 222A) associated with the second bank of fuses (e.g., fuse bank 220A) is to be blown. In response to receiving the program request, fuse controller 212 programs fuse bank 220B with the public key of the second entity and blows owner revoke fuse 222A to revoke the public key of the first entity stored in fuse bank 220A.

In accordance with one or more embodiments, the allow list of identifiers is included in a header of the firmware. For example, with reference to FIG. 2, the allow list of identifiers is included in a header of ownership transfer boot image 218.

III. Example Computer System Implementation

The systems and methods described above, including the transfer of ownership of a computing device from a first entity to a second entity in reference to FIGS. 1-5, may be implemented in hardware, or hardware combined with one or both of software and/or firmware. For example, boot code 216 and ownership transfer boot image 218 and/or flowcharts 300, 400, and 500 may be each implemented as computer program code/instructions configured to be executed in one or more processors (e.g., security processor core 202) and stored in a computer readable storage medium (e.g., memory 204). Security processor 106, CPU cores 104A-104D, memory 204, security processor core 202, encryption engine 206, access enforcement logic 210, fuse controller 212, and fuse array 214 may be implemented as hardware logic/electrical circuitry. In an embodiment, security processor 106, CPU cores 104A-104D, memory 204, security processor core 202, encryption engine 206, access enforcement logic 210, fuse controller 212, and fuse array 214, and/or each of the components described therein, and flowcharts 300, 400, and/or 500, may be implemented in one or more SoCs (system on chip) (e.g., SoC 102). An SoC may include an integrated circuit chip that includes one or more of a processor (e.g., CPU cores 104A-104D), microcontroller, microprocessor, digital signal processor (DSP), security processor 106, etc.), memory (e.g., memory 204), one or more communication interfaces (e.g., bus interconnects 108 and 208), and/or further circuits, and may optionally execute received program code and/or include embedded firmware to perform functions.

Figure 6:
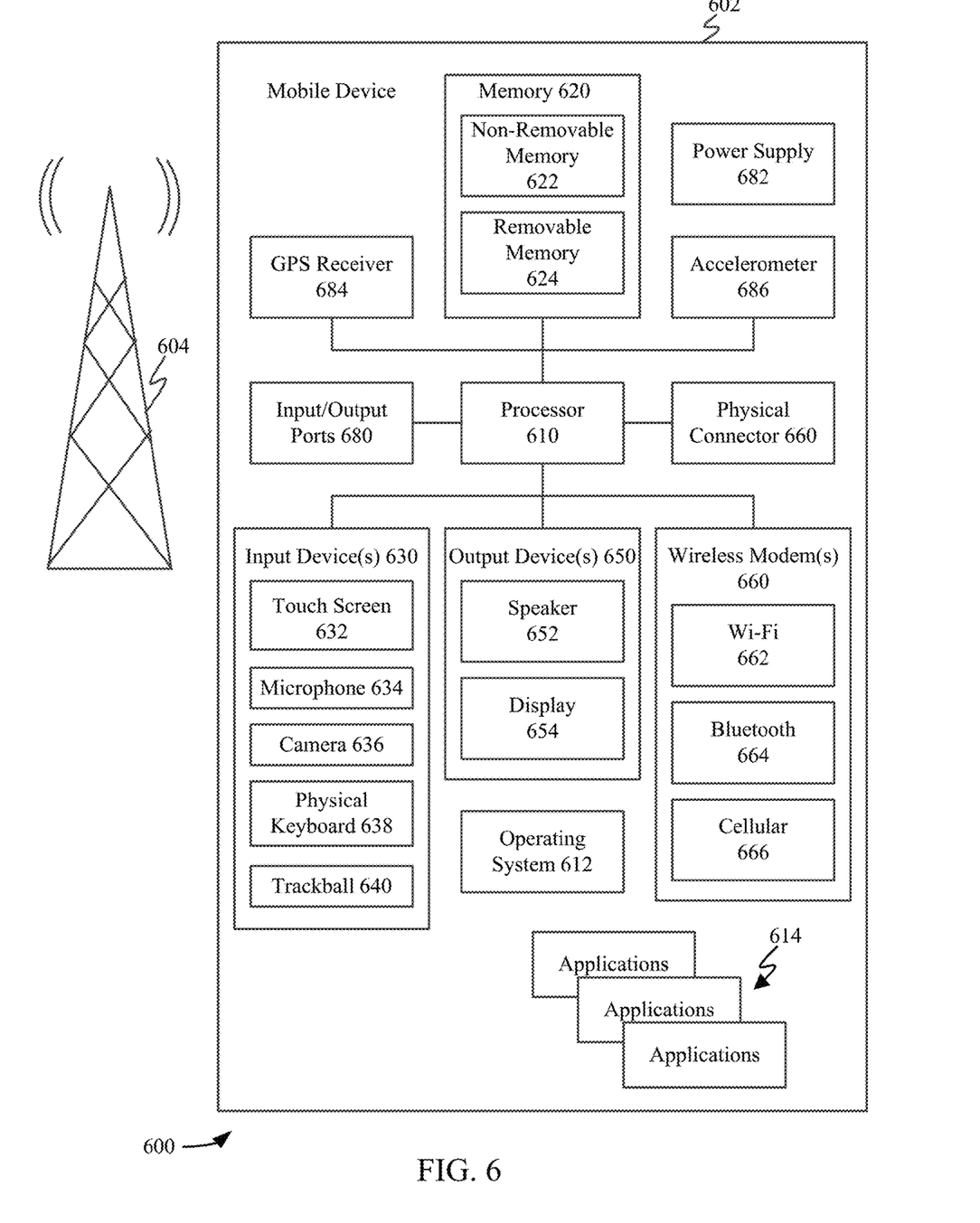
FIG. 6 is a block diagram of an exemplary user device in which embodiments may be implemented.

FIG. 6 shows a block diagram of an exemplary mobile device 600 including a variety of optional hardware and software components, shown generally as components 602. Any number and combination of the features/elements of security processor 106, CPU cores 104A-104D, memory 204, security processor core 202, encryption engine 206, access enforcement logic 210, fuse controller 212, and fuse array 214, and/or each of the components described therein, and flowcharts 300, 400, and/or 500 may be implemented as components 602 included in a mobile device embodiment, as well as additional and/or alternative features/elements, as would be known to persons skilled in the relevant art(s). It is noted that any of components 602 can communicate with any other of components 602, although not all connections are shown, for ease of illustration. Mobile device 600 can be any of a variety of mobile devices described or mentioned elsewhere herein or otherwise known (e.g., cell phone, smartphone, handheld computer, Personal Digital Assistant (PDA), etc.) and can allow wireless two-way communications with one or more mobile devices over one or more communications networks 604, such as a cellular or satellite network, or with a local area or wide area network.

The illustrated mobile device 600 can include a controller or processor referred to as processor circuit 610 (which may comprise CPU cores 104A-104N) for performing such tasks as signal coding, image processing, data processing, input/output processing, power control, and/or other functions. Processor circuit 610 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 610 may execute program code stored in a computer readable medium, such as program code of one or more applications 614, operating system 612, any program code stored in memory 620 (which is an example of memory 204), etc. Operating system 612 can control the allocation and usage of the components 602 and support for one or more application programs 614 (a.k.a. applications, "apps", etc.). Application programs 614 can include common mobile computing applications (e.g., email applications, calendars, contact managers, web browsers, messaging applications) and any other computing applications (e.g., word processing applications, mapping applications, media player applications). Security processor core 202 may be communicatively coupled to processor circuit 610.

As illustrated, mobile device 600 can include memory 620. Memory 620 can include non-removable memory 622 and/or removable memory 624. The non-removable memory 622 can include RAM, ROM, flash memory, a hard disk, or other well-known memory storage technologies. The removable memory 624 can include flash memory or a Subscriber Identity Module (SIM) card, which is well known in GSM communication systems, or other well-known memory storage technologies, such as "smart cards." The memory 620 can be used for storing data and/or code for running operating system 612 and applications 614. Example data can include web pages, text, images, sound files, video data, or other data sets to be sent to and/or received from one or more network servers or other devices via one or more wired or wireless networks. Memory 620 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

A number of programs may be stored in memory 620. These programs include operating system 612, one or more application programs 614, and other program modules and program data. Examples of such application programs or program modules may include, for example, computer program logic (e.g., computer program code or instructions) for implementing the systems and methods described above, including the embodiments described in reference to FIGS. 1-5.

Mobile device 600 can support one or more input devices 630, such as a touch screen 632, microphone 634, camera 636, physical keyboard 638 and/or trackball 640 and one or more output devices 650, such as a speaker 652 and a display 654.

Other possible output devices (not shown) can include piezoelectric or other haptic output devices. Some devices can serve more than one input/output function. For example, touch screen 632 and display 654 can be combined in a single input/output device. The input devices 630 can include a Natural User Interface (NUI).

Wireless modem(s) 660 can be coupled to antenna(s) (not shown) and can support two-way communications between processor circuit 610 and external devices, as is well understood in the art. The modem(s) 660 are shown generically and can include a cellular modem 666 for communicating with the mobile communication network 604 and/or other radio-based modems (e.g., Bluetooth 664 and/or Wi-Fi 662). Cellular modem 666 may be configured to enable phone calls (and optionally transmit data) according to any suitable communication standard or technology, such as GSM, 3G, 4G, 5G, etc. At least one of the wireless modem(s) 660 is typically configured for communication with one or more cellular networks, such as a GSM network for data and voice communications within a single cellular network, between cellular networks, or between the mobile device and a public switched telephone network (PSTN).

Mobile device 600 can further include at least one input/output port 680, a power supply 682, a satellite navigation system receiver 684, such as a Global Positioning System (GPS) receiver, an accelerometer 686, and/or a physical connector 660, which can be a USB port, IEEE 1394 (FireWire) port, and/or RS-232 port. The illustrated components 602 are not required or all-inclusive, as any components can be not present and other components can be additionally present as would be recognized by one skilled in the art.

Figure 7:
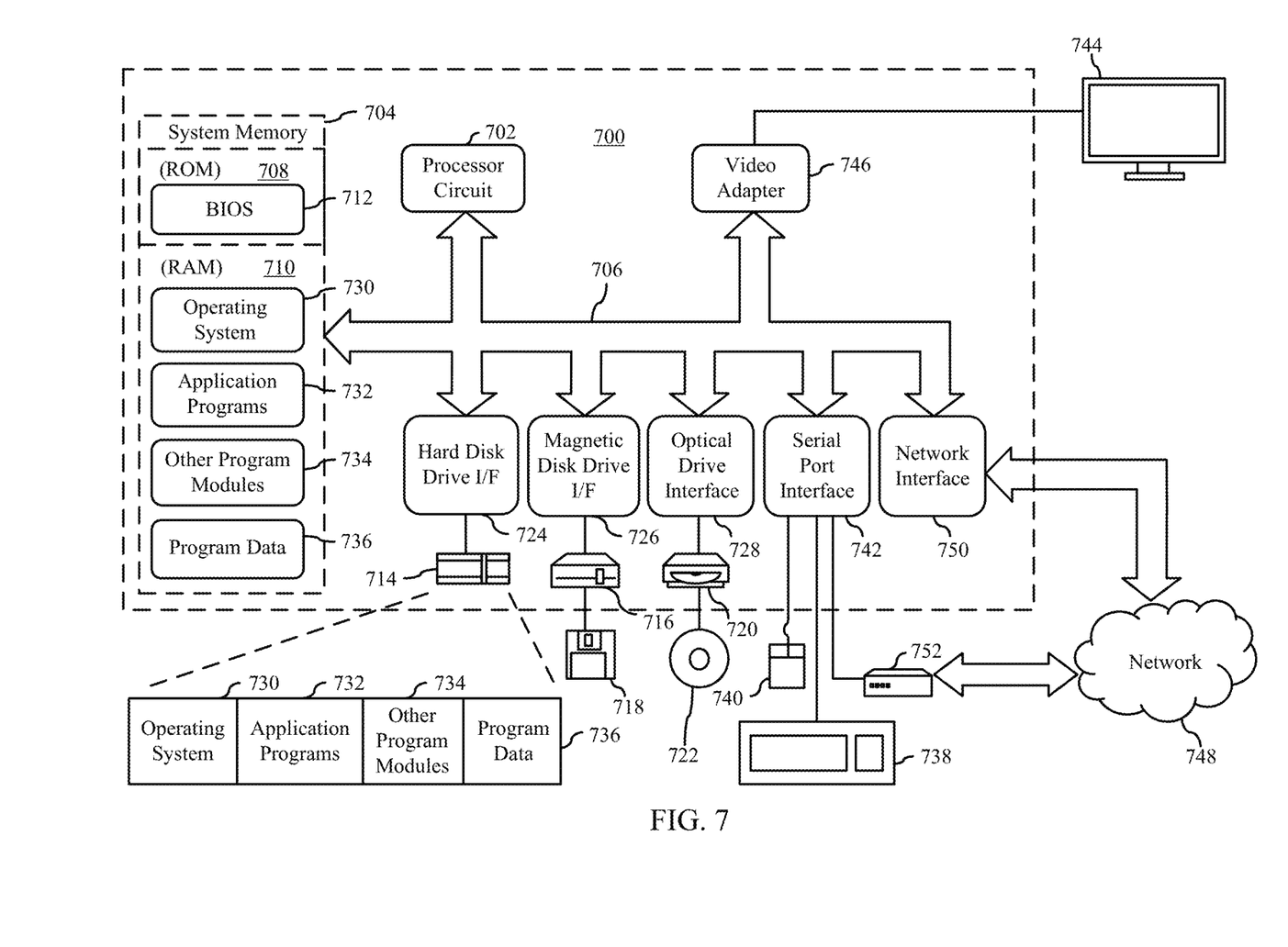
FIG. 7 is a block diagram of an example processor-based computer system that may be used to implement various embodiments.

FIG. 7 depicts an exemplary implementation of a computing device 700 in which embodiments may be implemented, including security processor 106, CPU cores 104A-104D, memory 204, security processor core 202, encryption engine 206, access enforcement logic 210, fuse controller 212, and fuse array 214, and/or each of the components described therein, and flowcharts 300, 400, and/or 500. The description of computing device 700 provided herein is provided for purposes of illustration, and is not intended to be limiting. Embodiments may be implemented in further types of computer systems, as would be known to persons skilled in the relevant art(s).

As shown in FIG. 7, computing device 700 includes one or more processors, referred to as processor circuit 702, a system memory 704, and a bus 706 that couples various system components including system memory 704 to processor circuit 702. Processor circuit 702 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 702 may execute program code stored in a computer readable medium, such as program code of operating system 730, application programs 732, other programs 734, etc. Bus 706 represents one or more of any of several types of bus structures, including a memory bus or memory controller, a peripheral bus, an accelerated graphics port, and a processor or local bus using any of a variety of bus architectures. System memory 704 includes read only memory (ROM) 708 (which is an example of memory 204) and random access memory (RAM) 710. A basic input/output system 712 (BIOS) is stored in ROM 708. CPU cores 104A-104D may be included in processor circuit 702. Security processor 106 may be communicatively coupled to processor circuit 702 via bus 706.

Computing device 700 also has one or more of the following drives: a hard disk drive 714 for reading from and writing to a hard disk, a magnetic disk drive 716 for reading from or writing to a removable magnetic disk 718, and an optical disk drive 720 for reading from or writing to a removable optical disk 722 such as a CD ROM, DVD ROM, or other optical media. Hard disk drive 714, magnetic disk drive 716, and optical disk drive 720 are connected to bus 706 by a hard disk drive interface 724, a magnetic disk drive interface 726, and an optical drive interface 728, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMS, ROMs, and other hardware storage media.

A number of program modules may be stored on the hard disk, magnetic disk, optical disk, ROM, or RAM. These programs include operating system 730, one or more application programs 732, other programs 734, and program data 736. Application programs 732 or other programs 734 may include, for example, computer program logic (e.g., computer program code or instructions) for implementing the systems described above, including the embodiments described in reference to FIGS. 1-5.

A user may enter commands and information into the computing device 700 through input devices such as keyboard 738 and pointing device 740. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 702 through a serial port interface 742 that is coupled to bus 706, but may be connected by other interfaces, such as a parallel port, game port, or a universal serial bus (USB).

A display screen 744 is also connected to bus 706 via an interface, such as a video adapter 746. Display screen 744 may be external to, or incorporated in computing device 700. Display screen 744 may display information, as well as being a user interface for receiving user commands and/or other information (e.g., by touch, finger gestures, virtual keyboard, etc.). In addition to display screen 744, computing device 700 may include other peripheral output devices (not shown) such as speakers and printers.

Computing device 700 is connected to a network 748 (e.g., the Internet) through an adaptor or network interface 750, a modem 752, or other means for establishing communications over the network. Modem 752, which may be internal or external, may be connected to bus 706 via serial port interface 742, as shown in FIG. 7, or may be connected to bus 706 using another interface type, including a parallel interface.

As used herein, the terms "computer program medium," "computer-readable medium," and "computer-readable storage medium" are used to generally refer to physical hardware media such as the hard disk associated with hard disk drive 714, removable magnetic disk 718, removable optical disk 722, other physical hardware media such as RAMs, ROMs, flash memory cards, digital video disks, zip disks, MEMs, nanotechnology-based storage devices, and further types of physical/tangible hardware storage media (including system memory 704 of FIG. 7). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 732 and other programs 734) may be stored on the hard disk, magnetic disk, optical disk, ROM, RAM, or other hardware storage medium. Such computer programs may also be received via network interface 750, serial port interface 752, or any other interface type. Such computer programs, when executed or loaded by an application, enable computing device 700 to implement features of embodiments discussed herein. Accordingly, such computer programs represent controllers of the computing device 700.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Additional Exemplary Embodiments

A system is described herein. The system includes: at least one processor circuit; a first set of fuses that stores a first public key associated with a first entity; a second set of fuses; and at least one memory that stores boot code and firmware configured to be executed by the at least one processor circuit, the execution of the boot code causing the at least one processor circuit to: during a boot session of the system: detect an indication of a transfer of ownership of the system from the first entity to a second entity; and execute the firmware by the at least one processor circuit, the execution of the firmware causing the at least one processor circuit, causes the at least one processor circuit to: in response to at least detecting the indication of the transfer of ownership of the system being transferred from the first entity to the second entity: program the second set of fuses to store a second public key associated with the second entity; and blow a fuse associated with the first set of fuses that causes the second public key to be invalid.

In an embodiment of the system, the firmware is signed with a private key of the first entity.

In an embodiment of the system, the indication comprises a flag in a header of the firmware that, when set, indicates the transfer of ownership of the system from the first entity to the second entity.

In an embodiment of the system, the execution of the boot code by the least one processor circuit causes the at least one processor circuit to: determine whether the flag is set; in response to a determination that the flag is not set, prevent the second set of fuses from being programmed and prevent the fuse associated with the first set of fuses from being blown; and in response to a determination that the flag is set, enable the second set of fuses to be programmed and enable the fuse associated with the first set of fuses to be blown.

In an embodiment of the system, the execution of the firmware by the at least one processor circuit causes the at least one processor circuit to: determine an identifier of the system; determine whether the identifier is included in an allow list of identifiers; in response to at least detecting the indication of the transfer of ownership of the system and a determination that the first identifier is included in the allow list, program the second set of fuses and blow the fuse associated with the first set of fuses; and in response to a determination that the first identifier is not included in the allow list, abort the boot session.

In an embodiment of the system, the allow list of identifiers is included in a header of the firmware.

In an embodiment of the system, the processing circuit is implemented on a same die as a plurality of central processing circuit cores.

A method implemented by a computing device is also described herein. The method comprises: during a boot session of the computing device: detecting an indication of a transfer of ownership of the computing device being transferred from a first entity to a second entity; and in response to at least detecting the indication of the transfer of ownership of the computing device from the first entity to the second entity: programming a first set of fuses to store a first public key associated with the second entity; and blowing a fuse, associated with a second set of fuses that stores a second public key associated with the first entity, that causes the first public key to be invalid.

In an embodiment of the method, the indication comprises a flag in a header of the firmware that, when set, indicates the transfer of ownership of the computing device from the first entity to the second entity.

In an embodiment of the method, the firmware is signed with a private key of the first entity.

In an embodiment of the method, the method further comprises: determining whether the flag is set; in response to determining that the flag is not set, preventing the first set of fuses from being programmed and preventing the fuse associated with the second set of fuses from being blown; and in response to determining that the flag is set, enabling the first set of fuses to be programmed and enabling the fuse associated with the second set of fuses to be blown.

In an embodiment of the method, determining an identifier of the computing device; determining whether the identifier is included in an allow list of identifiers; in response to at least detecting the indication of the transfer of ownership of the computing device and determining the first identifier is included in the allow list, programming the first set of fuses and blowing the fuse associated with the second set of fuses; and in response to a determining that the first identifier is not included in the allow list, aborting the boot session.

In an embodiment of the method, the allow list of identifiers is included in a header of the firmware.

In an embodiment of the method, boot code of the computing device, when executed by a processor of the computing device, performs said detecting, and firmware of the computing device, when executed by the computing device, performs said programming and blowing.

A computer-readable storage medium having program instructions recorded thereon that, when executed by a processor of a computing device, perform a method, is also described herein. The method includes: during a boot session of the computing device: detecting an indication of a transfer of ownership of the computing device from a first entity to a second entity; and in response to at least detecting the indication of the transfer of ownership of the computing device from the first entity to the second entity: programming a first set of fuses to store a first public key associated with the second entity; and blowing a fuse, associated with a second set of fuses that stores a second public key associated with the first entity, that causes the first public key to be invalid.

In an embodiment of the computer-readable storage medium, the indication comprises a flag in a header of the firmware that, when set, indicates the transfer of ownership of the computing device from the first entity to the second entity.

In an embodiment of the computer-readable storage medium, the firmware is signed with a private key of the first entity.

In an embodiment of the computer-readable storage medium, determining whether the flag is set; in response to determining that the flag is not set, preventing the first set of fuses from being programmed and preventing the fuse associated with the second set of fuses from being blown; and in response to determining that the flag is set, enabling the first set of fuses to be programmed and enabling the fuse associated with the second set of fuses to be blown.

In an embodiment of the computer-readable storage medium, determining an identifier of the computing device; determining whether the identifier is included in an allow list of identifiers; in response to at least detecting the indication of the transfer of ownership of the computing device and determining the first identifier is included in the allow list, programming the first set of fuses and blowing the fuse associated with the second set of fuses; and in response to a determining that the first identifier is not included in the allow list, aborting the boot session.

In an embodiment of the computer-readable storage medium, the allow list of identifiers is included in a header of the firmware.

V. CONCLUSION

While various embodiments have been described above, it should be understood that they have been presented by way of example only, and not limitation. It will be apparent to persons skilled in the relevant art that various changes in form and detail can be made therein without departing from the spirit and scope of the embodiments. Thus, the breadth and scope of the embodiments should not be limited by any of the above-described exemplary embodiments, but should be defined only in accordance with the following claims and their equivalents.

What is claimed is:
1. A system comprising:
a processor; and
memory coupled to the processor, the memory comprising computer executable instructions that, when executed, perform operations comprising:
detecting an indication of a transfer of ownership of the system from a first user to a second user;
identifying a public key of the second user, the public key being used to verify information of the second user;
programming a first set of fuses to store the public key of the second user, wherein programming the first set of fuses is independent to a second set of fuses storing a public key of the first user; and
invalidating the public key of the first user by blowing a fuse associated with the second set of fuses.

2. The system of claim 1, wherein the indication of the transfer of ownership is detected during a boot session of the system.

3. The system of claim 2, wherein a security processor of the system loads and executes boot code during the boot session of the system to detect the indication of the transfer of ownership.

4. The system of claim 1, wherein the indication of the transfer of ownership comprises a flag in firmware implemented by the system.

5. The system of claim 4, wherein the firmware is signed with a private key of the first user.

6. The system of claim 1, wherein programming the first set of fuses to store the public key of the second user comprises providing a program request to a fuse controller of the system, the program request comprising the public key of the second user.

7. The system of claim 1, the operations further comprising:
prior to programming the first set of fuses to store the public key of the second user:
determining an identifier for the system; and
determining the identifier is included in an allow list; and
in response to determining the identifier is included in the allow list, programming the first set of fuses to store the public key of the second user.

8. The system of claim 1, wherein access enforcement logic of the system is configured to allow or deny an ability to program the first set of fuses based on the indication of the transfer of ownership.

9. The system of claim 1, wherein the system is a system on a chip (SOC).

10. A device comprising:
a processor; and
memory coupled to the processor, the memory comprising computer executable instructions that, when executed, perform operations comprising:
detecting an indication of a transfer of ownership of the device from a first owner to a second owner;
identifying an identifier associated with the second owner, the identifier being used to verify information of the second owner;
programming a first set of fuses to store the identifier associated with the second owner, wherein programming the first set of fuses is independent to a second set of fuses storing an identifier associated with the first owner; and
invalidating the identifier associated with the first owner by blowing a fuse associated with the second set of fuses.

11. The device of claim 10, wherein the memory further comprises an ownership transfer boot image that includes a flag denoting whether the ownership transfer boot image is configured to perform the transfer of ownership.

12. The device of claim 11, wherein the flag is stored in a header of the ownership transfer boot image, the header further storing at least one of:
an allow list of one or more identifiers of the device;
the identifier associated with the first owner; or
the identifier associated with the second owner.

13. The device of claim 11, the operations further comprising:
prior to programming the first set of fuses to store the identifier associated with the second owner:
verifying the identifier associated with the first owner to ensure that the ownership transfer boot image was provided by an authorized entity.

14. The device of claim 13, wherein verifying the identifier associated with the first owner comprises:
sending a read request to a fuse controller of the device, the fuse controller having access to the first set of fuses and the second set of fuses;
receiving the identifier associated with the first owner from the second set of fuses; and
determining the identifier associated with the first owner matches an expected value.

15. The device of claim 10, wherein the identifier associated with the first owner is a first public key and the identifier associated with the second owner is a second public key that is different from the first public key.

16. The device of claim 10, wherein the identifier associated with the first owner is a hash of a first public key and the identifier associated with the second owner is a hash of a second public key that is different from the hash of the first public key.

17. The device of claim 16, wherein the hash of the first public key and the hash of a second public key are generated using an encryption engine of the device.

18. The device of claim 10, wherein detecting the indication of the transfer of ownership of the device comprises comparing an identifier for the device to an allow list of identifiers included in a header of firmware stored in the memory.

19. The device of claim 10, wherein the first set of fuses and the second set of fuses are stored in a fuse array of one-time programmable fuses.

20. A device comprising:
detecting an indication of a transfer of ownership of the device from a first owner to a second owner;
identifying an identifier associated with the second owner, the identifier being used to verify information of the second owner;
programming a first set of fuses to store the identifier associated with the second owner, wherein programming the first set of fuses is independent to a second set of fuses storing an identifier associated with the first owner; and
invalidating the identifier associated with the first owner by blowing a fuse associated with the second set of fuses.

* * * * *